Aug. 31, 1948.                G. E. DATH                 2,448,139
                 FRICTION SHOCK ABSORBING MECHANISM
                     FOR RAILWAY DRAFT RIGGINGS
                        Filed Sept. 19, 1945
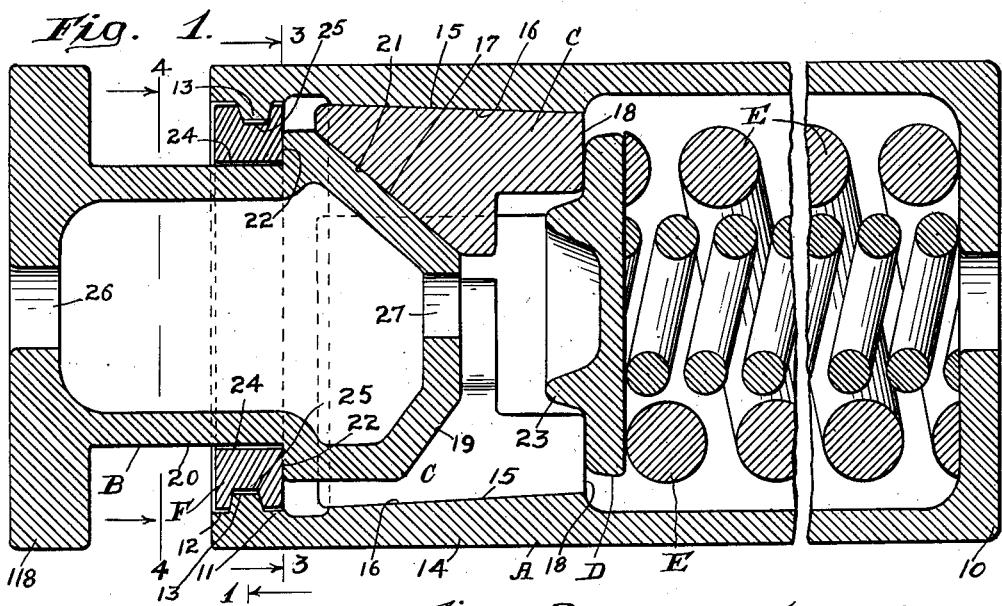
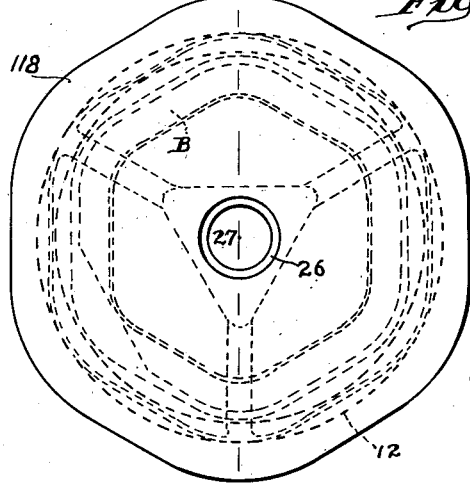
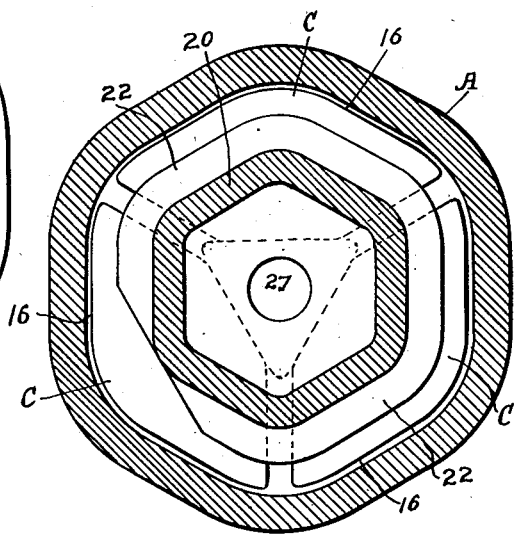
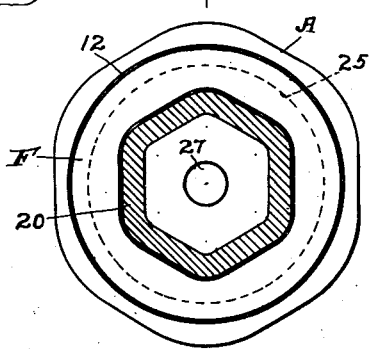
Inventor:
George E. Dath.
By Henry Fuchs.
Atty.

Patented Aug. 31, 1948

2,448,139

UNITED STATES PATENT OFFICE 2,448,139

FRICTION SHOCK ABSORBING MECHANISM FOR RAILWAY DRAFT RIGGINGS

George E. Dath, Mokena, Ill., assignor to W. H. Miner, Inc., Chicago, Ill., a corporation of Delaware Application September 19, 1945, Serial No. 617,296

10 Claims. (Cl. 213—34)

1

This invention relates to improvements in friction shock absorbing mechanisms especially adapted for railway draft riggings.

One object of the invention is to provide a friction shock absorbing mechanism comprising a friction casing open at one end, and a spring resisted friction clutch slidable within the open front end of the casing, wherein the clutch includes a pressure transmitting wedge member held assembled with the casing by a retaining element or ring in threaded engagement with the casing.

A further object of the invention is to provide in a mechanism, as set forth in the preceding paragraph, a retaining element or ring with which the wedge member has shouldered engagement to limit outward movement of the latter, wherein the threaded ring or retaining element is interlocked with the wedge for rotation in unison therewith in assembling the mechanism to screw the ring into the casing by rotation of the wedge and thereby secure the ring in its retaining position.

A more specific object of the invention is to provide a friction shock absorbing mechanism comprising a friction casing closed at one end and open at the other end, a plurality of friction shoes having sliding frictional engagement with the interior wall of the casing at said open end thereof, a retaining ring in threaded engagement with the open end of the casing, a pressure transmitting wedge member in wedging engagement with the shoes and having shouldered engagement with the ring to limit outward movement of the wedge member, and spring means within the casing yieldingly opposing movement of the shoes, wherein the threaded ring is effectively locked against accidental removal from the casing by the provision of interengaging friction surfaces on the casing and shoes which hold the shoes against rotation with respect to the casing, interengaging wedge faces on the shoes and wedge block which prevent relative rotation of the shoes and block, and interengaging means on the wedge block and threaded ring which holds the latter against rotation with respect to the wedge block.

Other objects of the invention will more clearly appear from the description and claims hereinafter following.

In the drawing forming a part of this specification, Figure 1 is a longitudinal, vertical sectional view of my improved shock absorbing mechanism, corresponding substantially to the line 1—1 of Figure 2. Figure 2 is a front end elevational view of Figure 1, looking from left to right in said figure. Figure 3 is a transverse, vertical sectional view, corresponding substantially to the line 3—3 of Figure 1. Figure 4 is a transverse, vertical sectional view, on a reduced scale, corresponding substantially to the line 4—4 of Figure 1.

My improved friction shock absorbing mechanism, as shown in the drawing, comprises broadly a friction casing A; a wedge block B; three friction shoes C—C—C; a spring follower D; a spring resistance E; and a retaining ring F.

The casing A is in the form of a tubular member of hexagonal, transverse cross section, closed at its rear end by a vertical, transverse wall 10. At the forward end, the casing A is provided with an inturned flange 11 which presents a circular opening 12. The flange 11 is threaded at said opening, as indicated at 13. The walls of the casing are inwardly thickened, rearwardly of the opening 12, as indicated at 14, said thickened portion of the casing forming the friction shell proper thereof. The friction shell portion of the casing presents three longitudinally extending, interior friction surfaces 15—15—15, which are of V-shaped cross section and converge inwardly of the casing. Each friction surface 15 is composed of two adjacent walls of the hexagonal casing.

The three friction shoes C—C—C are of similar design, except as hereinafter pointed out. Each friction shoe C has a V-shaped, longitudinally extending friction surface 16 on the outer side thereof engaging the corresponding friction surface of the casing A. On the inner side, each shoe has a flat wedge face 17 which cooperates with the wedge block B. At the inner ends the shoes are provided with flat, transverse end faces 18—18—18 providing abutments for the spring follower D.

The wedge B is in the form of a hollow member comprising a platelike follower section 118 at the outer end thereof, adapted to be engaged by the front follower of the railway draft rigging, a head 19 at the rear end and a shank portion 20 connecting the follower 118 and the head 19. The follower 118 is preferably of hexagonal outline and is formed by the laterally projecting, relatively heavy flange at the outer end of the shank 20. The hexagonal follower 118 is preferably of the same size as the casing so that it will engage the outer end of the latter to limit compression of the mechanism. The head 19 forms the wedge proper and has three inwardly converging, flat wedge faces 21—21—21 engaging the wedge faces 17—17—17 of the shoes C—C—C respectively. As shown in the drawing, the cooperating wedge faces of the wedge B and two of the shoes C—C are relatively blunt while the cooperating wedge faces of the wedge and the remaining shoe are relatively keen. The shank 20 of the wedge block B is of hexagonal, interior and exterior cross section, as clearly shown in Figures 3 and 4 and is of reduced size with respect to the head 19, thereby providing transverse stop shoulders 22—22—22 which cooperate with the retaining ring F, as hereinbefore pointed out, to limit outward movement of the wedge member with respect to the casing A.

The spring follower D is in the form of a relatively heavy plate bearing on the flat rear ends 18—18—18 of the shoes C—C—C. The follower D is provided with a forwardly projecting centering flange 23 engaging between the shoes C—C—C, the flange 23 being of hexagonal outline and having its outer face beveled or inclined.

The spring resistance E comprises a relatively heavy, outer coil and a lighter inner coil bearing at their opposite ends on the spring follower D and the wall 10 of the casing.

The retaining ring F is in the form of an annulus. The opening of the ring F, which is indicated by 24, is of hexagonal shape to fit the shank 20 of the wedge member B. The ring F surrounds the shank 20 and the opening 24 thereof is of such a size as to slidingly accommodate the shank for lengthwise movement but lock the ring and wedge against relative rotation. The hexagonal contour of the shank of the wedge and the opening of the ring provide interengaging V-shaped portions which interlock to prevent relative rotation of these parts. The ring F has an exterior thread, indicated by 25, which is engaged with the thread 13 of the casing A, thereby securing the ring to the casing. As will be evident, in the assembled condition of the mechanism, the retaining ring F forms a stop for limiting outward movement of the wedge B by engagement of the stop shoulders 22—22—22 of the latter therewith. The ring F is permanently mounted on the shank 20 of the wedge member by being cast thereabout. In the assembled condition of the mechanism, the ring F is preferably so adjusted that the spring resistance E is under initial compression.

In assembling the mechanism, the casing A is set on end and the spring E, spring follower D, and the shoes C—C—C are placed within the casing. The wedge member B with the ring F thereon is then applied to the casing in the following manner: The wedge member and ring are brought into alignment with the open end of the casing and the springs E are compressed by a tool in the form of a cylindrical bar or rod pressed against the spring follower D, the tool being engaged through central openings 26 and 27 provided for that purpose at the front and rear ends of the wedge member. The spring follower D is forced inwardly to such an extent that the shoes C—C—C, which are resting thereon will gravitate inwardly of the casing to a position wherein the wedge faces thereof will completely clear the corners presented by the meeting edges of the wedge faces of the wedge member, so that the wedge member may be freely rotated when forced inwardly of the casing to the extent shown in Figure 1. While the parts are held in this position by the tool, the retaining ring F, which is carried on the shank of the wedge member, is screwed into the open end of the casing by rotating the wedge member, the latter acting as a wrench in this operation. When the retaining ring has been screwed home, the tool is withdrawn, permitting the spring E to expand and force the shoes forwardly into wedging engagement with the wedge member. As will be evident, when the mechanism is thus expanded the force of the spring resistance maintains the shoes projected, thereby locking the wedge against rotation with respect to the casing, the interengaged V-shaped friction surfaces of the shoes and casing preventing rotation of the shoes, and the engaging flat wedge faces of the shoes and wedge locking the latter against rotation with respect to the shoes. The wedge member being thus locked against rotation in turn locks the ring against accidental removal by the shouldered engagement provided between the hexagonal shank of the wedge and the walls of the hexagonal opening of the retaining ring F.

The operation of my improved shock absorbing mechanism is as follows: Upon compression of the mechanism the wedge B is forced inwardly of the casing against the spring resisted shoes C—C—C, thereby wedging the shoes apart and forcing the same to slide inwardly on the friction surfaces of the casing. High frictional resistance is thus produced. In release, when the actuating force is removed, the expansive action of the spring restores all of the parts to the normal full release position shown in Figure 1, outward movement of the wedge B being limited by the shouldered engagement with the retaining ring F.

I claim:

1. In a friction shock absorbing mechanism, the combination with a friction casing open at one end and having interior friction surfaces at said open end; of a friction clutch slidable within said open end of the casing, said clutch including a wedge and friction shoes surrounding said wedge, said wedge and shoes having cooperating wedge faces holding said wedge and shoes against relative rotation, said shoes having friction surfaces interengaging with the friction surfaces of the casing and holding the shoes against rotation with respect to the casing; spring means within the casing yieldingly opposing inward movement of the shoes; a retaining ring in interior threaded engagement with the open end of the casing, said ring having shouldered engagement with the wedge to limit outward movement of the latter; and interengaging means on said ring and wedge for locking the ring against rotation with respect to the wedge, said shoes, in the operation of assembling the mechanism, being displaceable inwardly of the casing with respect to the wedge to disengage the shoes from the wedge and permit rotation of the latter and of the ring which is locked thereto to thread the ring within said open end of the casing.

2. In a friction shock absorbing mechanism, the combination with a friction casing open at one end, said casing being of angular transverse cross section; of a stop ring in interiorly threaded engagement with the open end of the casing; friction shoes in sliding frictional engagement with the interior walls of the casing at the open end thereof, said shoes interfitting with said angular casing to be held against rotation with respect to the casing; a central wedge in wedging engagement with the shoes, said wedge being held against rotation by said wedging engagement with the shoes, said wedge having shouldered engagement with the ring to limit outward movement of the wedge; an outwardly extending shank on said wedge projecting through the opening of the ring, said shank having shouldered engagement with the ring to lock the wedge against rotation with respect to the ring; and a spring within the casing yieldingly opposing inward movement of the shoes, said shoes, in assembling of the mechanism, being displaceable inwardly of the casing to disengaged position with respect to the wedge to permit rotation of the latter and of the ring therewith to thread the ring into the casing.

3. In a friction shock absorbing mechanism, the combination with a friction casing open at one end; of a retaining ring threaded into the open end of the casing; a spring resisted friction clutch slidable within the casing, said clutch including a wedge member having a shank extending through the opening of said ring, said wedge member having shouldered engagement with the ring to limit outward movement of the wedge member, the shank of said wedge and the opening of said ring being of non-circular, interfitting cross section to hold said ring and wedge against relative rotation, whereby, in assembling the mechanism, said ring is rotatable with the wedge to thread the ring into said open end of the casing.

4. In a friction shock absorbing mechanism, the combination with a friction casing open at one end; of a retaining ring threaded into the open end of the casing; a spring resisted friction clutch slidable within the casing, said clutch including a wedge member having a shank extending through the opening of said ring, said wedge member having shouldered engagement with the ring to limit outward movement of the wedge member, the shank of said wedge and the opening of said ring being of angular, interfitting cross section to hold said ring and wedge against relative rotation whereby, in the operation of assembling the mechanism, said ring is rotatable with the wedge to thread the ring into the open end of the casing.

5. In a friction shock absorbing mechanism, the combination with a friction casing open at one end; of a retaining ring threaded into the open end of the casing; a spring resisted friction clutch slidable within the casing, said clutch including a wedge member having a shank extending through the opening of said ring, said wedge member having shouldered engagement with the ring to limit outward movement of the wedge member, the shank of said wedge and the opening of said ring being of hexagonal, interfitting cross section to hold said ring and wedge against relative rotation in the assembled condition of the mechanism, and locking said ring to the wedge member for rotation therewith in the operation of assembling the mechanism to thread said ring into the open end of the casing by rotation of said wedge member.

6. In a friction shock absorbing mechanism, the combination with a friction casing open at one end; of friction shoes slidable within the open end of the casing, said shoes and casing having interengaging friction surfaces restricting the shoes to movement in a direction lengthwise of the casing; a central wedge member, said wedge member and shoes having engaging wedge faces holding the wedge and shoes against relative rotation; a retaining ring for said wedge member having interior threaded engagement with the open end of the casing and shouldered engagement with the wedge member to limit outward movement of the latter; a projecting stem on said wedge member rigid therewith, said stem extending through the opening of said ring, said stem and ring having portions thereof in shouldered engagement with each other to lock said ring against rotation with respect to said wedge member and turning with respect to the casing to maintain the same in its threaded engagement; and spring means within the casing yieldingly opposing inward movement of said shoes.

7. In a friction shock absorbing mechanism, the combination with a friction casing open at one end; of friction shoes slidable within the open end of the casing, said shoes and casing having interengaging friction surfaces restricting the shoes to movement in a direction lengthwise of the casing; a central wedge member, said wedge member and shoes having engaging wedge faces holding the wedge and shoes against relative rotation; a retaining ring for said wedge member having interior threaded engagement with the open end of the casing and shouldered engagement with the wedge member to limit outward movement of the latter; a projecting stem on said wedge member rigid therewith, said stem extending through the opening of said ring, said stem of said wedge member and the opening of said ring being of non-circular, interfitting cross section to lock said ring against rotation with respect to said wedge member and turning with respect to the casing to maintain the same in threaded engagement with the casing; and spring means within the casing yieldingly opposing inward movement of said shoes.

8. In a friction shock absorbing mechanism, the combination with a friction casing open at one end; of friction shoes slidable within the open end of the casing, said shoes and casing having interengaging friction surfaces restricting the shoes to movement in a direction lengthwise of the casing; a central wedge member, said wedge member and shoes having engaging wedge faces holding the wedge and shoes against relative rotation; a retaining ring for said wedge member having interior threaded engagement with the open end of the casing and shouldered engagement with the wedge member to limit outward movement of the latter; a projecting stem on said wedge member rigid therewith, said stem extending through the opening of said ring, said stem of said wedge member and the opening of said ring being of interfitting, angular cross section to lock said ring against rotation with respect to said wedge member and turning with respect to the casing to prevent disengagement of said ring from the casing; and spring means within the casing yieldingly opposing inward movement of said shoes.

9. In a friction shock absorbing mechanism, the combination with a friction casing open at one end; of friction shoes slidable within the open end of the casing, said shoes and casing having interengaging friction surfaces restricting the shoes to movement in a direction lengthwise of the casing; a central wedge member, said wedge member and shoes having engaging wedge faces holding the wedge and shoes against relative rotation; a retaining ring for said wedge member having interior threaded engagement with the open end of the casing and shouldered engagement with the wedge member to limit outward movement of the latter; a projecting stem on said wedge member rigid therewith, said stem extending through the opening of said ring, said stem of said wedge member and the opening of said ring being of interfitting, hexagonal cross section to lock said ring against rotation with respect to said wedge member when the mechanism is in assembled condition, and effect rotation of the ring by rotation of the wedge member to thread the ring into the casing in assembling the mechanism; and spring means within the casing yieldingly opposing inward movement of said shoes.

10. In a friction shock absorbing mechanism, the combination with a friction casing open at one end; of friction shoes slidable within the open end of the casing, said shoes and casing having interengaging V-shaped friction surfaces extending lengthwise of the mechanism; a central wedge member, said wedge member and shoes having engaging flat wedge faces; a retaining ring threaded into the open end of the casing and having shouldered engagement with the wedge member to limit outward movement of the latter; a projecting stem on said wedge rigid therewith, said stem extending through the opening of said ring, said stem and opening of said ring being of interfitting, hexagonal cross section to lock said ring against rotation with respect to said wedge member and prevent disengagement of said ring from the casing; and spring means within the casing yieldingly opposing inward movement of said shoes.

GEORGE E. DATH.

REFERENCES CITED

The following references are of record in the file of this patent:

UNITED STATES PATENTS

| Number | Name | Date |
|---|---|---|
| 2,076,769 | Dentler | Apr. 13, 1937 |
| 2,080,615 | Loewer | May 18, 1937 |
| 2,139,701 | Sproul | Dec. 13, 1938 |